(12) United States Patent
Nate

(10) Patent No.: US 9,231,483 B2
(45) Date of Patent: Jan. 5, 2016

(54) DC/DC CONVERTER

(71) Applicant: ROHM CO., LTD., Kyoto (JP)

(72) Inventor: Satoru Nate, Kyoto (JP)

(73) Assignee: ROHM CO., LTD. (JP)

( * ) Notice: Subject to any disclaimer, the term of this patent is extended or adjusted under 35 U.S.C. 154(b) by 262 days.

(21) Appl. No.: 13/950,838

(22) Filed: Oct. 15, 2013

(65) Prior Publication Data

US 2014/0063865 A1 Mar. 6, 2014

(30) Foreign Application Priority Data

Jul. 27, 2012 (JP) ................. 2012-167740

(51) Int. Cl.
*H02M 3/335* (2006.01)
*H02M 1/00* (2007.01)

(52) U.S. Cl.
CPC ...... *H02M 3/33515* (2013.01); *H02M 3/33507* (2013.01); *H02M 2001/0035* (2013.01); *Y02B 70/16* (2013.01)

(58) Field of Classification Search
CPC .............. H02M 3/33507; H02M 3/33515; H02M 3/33538; H02M 3/33546
USPC ............ 363/21.04, 21.05, 21.08, 21.1, 21.11, 363/21.12, 21.13, 21.16, 21.18, 97
See application file for complete search history.

(56) References Cited

U.S. PATENT DOCUMENTS

| 2014/0063865 A1* | 3/2014 | Nate | 363/21.13 |
| 2014/0160803 A1* | 6/2014 | Sato | 363/21.01 |
| 2014/0160808 A1* | 6/2014 | Sato | 363/21.02 |
| 2014/0369083 A1* | 12/2014 | Woo et al. | 363/21.03 |
| 2015/0098255 A1* | 4/2015 | Nate | 363/21.16 |

FOREIGN PATENT DOCUMENTS

| JP | 02211055 A | 8/1990 |
| JP | 09098571 A | 4/1997 |

* cited by examiner

*Primary Examiner* — Jeffrey Sterrett
(74) *Attorney, Agent, or Firm* — Cantor Colburn LLP

(57) ABSTRACT

A pulse modulator generates a pulse modulation signal $S_{PM}$ having a duty ratio which is adjusted according to a feedback voltage Vfb that corresponds to the output voltage VOUT of a DC/DC converter. A second oscillator generates a second cyclic signal which is asserted with each of a predetermined second period. A light load detection circuit generates a light load detection signal which is asserted when the feedback voltage Vfb becomes lower than a first threshold voltage. A driving circuit drives a switching transistor according to the pulse modulation signal $S_{PM}$. Furthermore, the driving circuit suspends the driving of the switching transistor during a period until the second cyclic signal is next asserted after the light load detection signal is asserted.

25 Claims, 8 Drawing Sheets

DC/DC CONVERTER

The present invention claims priority under 35 U.S.C. §119 to Japanese Application No. 2012-167740 filed Jul. 27, 2012, the entire content of which is incorporated herein by reference.

BACKGROUND OF THE INVENTION

1. Field of the Invention

The present invention relates to a DC/DC converter.

2. Description of the Related Art

Various kinds of consumer electronics devices such as TVs, refrigerators, etc., are each configured to operate receiving commercial AC electric power from an external circuit. Also, electronic devices such as laptop computers, cellular phone terminals, and PDAs (Personal Digital Assistants) are each configured to operate using commercial AC electric power, and/or to be capable of charging a built-in battery using such commercial AC electric power. Such consumer electronics devices and electronic devices (which will collectively be referred to as "electronic devices" hereafter) each include a built-in power supply apparatus (inverter) configured to perform AC/DC conversion of commercial AC voltage. Alternatively, such an inverter is configured as a built-in component included within an external power supply adapter (AC adapter) for such an electronic device.

Related techniques are disclosed in Japanese Patent Application Laid-Open No. H09-098571, and Japanese Patent Application Laid-Open No. H02-211055, for example.

FIG. 1 is a block diagram showing an inverter investigated by the present inventor. An inverter 1r mainly includes a fuse 2, an input capacitor Ci, a filter 4, a diode rectifier circuit 6, a smoothing capacitor Cs, and a DC/DC converter 10r.

The commercial AC voltage $V_{AC}$ is input to the filter 4 via the fuse 2 and the input capacitor Ci. The filter 4 is configured to remove noise included in the commercial AC voltage $V_{AC}$. The diode rectifier circuit 6 is configured as a diode bridge circuit configured to perform full-wave rectification of the commercial AC voltage $V_{AC}$. The output voltage of the diode rectifier circuit 6 is smoothed by the smoothing capacitor Cs, thereby generating a converted DC voltage VH.

The insulated DC/DC converter 10r is configured to receive the DC voltage VH via an input terminal P1, to step down the DC voltage VH thus received, and to supply an output voltage VOUT stabilized to the target value to a load (not shown) connected to an output terminal P2.

The DC/DC converter 10r includes a control circuit 100r, an output circuit 200, and a feedback circuit 210. The output circuit 200 includes a transformer T1, a first diode D1, a first output capacitor CM, a switching transistor M1, and a detection resistor RS. The output circuit 200 has a typical topology, and accordingly, detailed description thereof will be omitted.

An output terminal (OUT terminal) of the control circuit 100r is connected to the gate of the switching transistor M1 via a resistor Rg. The control circuit 100r is configured to perform switching of the switching transistor M1 so as to step down the input voltage VH, thereby generating the output voltage VOUT. Furthermore, by adjusting the duty ratio of the switching operation of the switching transistor M1, the control circuit 100r is configured to stabilize the output voltage VOUT to a target value, and to control a coil current ILp that flows through a primary winding W1 of the transformer T1.

The detection resistor RS is arranged in series with the primary winding W1 of the transformer T1 and the switching transistor M1. A voltage drop (detection voltage) $V_{CS}$, which is proportional to the current ILp that flows through the primary winding W1 and the switching transistor M1, develops across the detection resistor RS. The detection voltage $V_{CS}$ is input to a current detection terminal (CS terminal) of the control circuit 100r. The control circuit 100r is configured to control, based on the detection voltage $V_{CS}$, the current ILp that flows through the primary winding W1.

The feedback circuit 210 is configured to generate a feedback voltage Vfb that corresponds to the output voltage VOUT, and to supply the feedback voltage Vfb thus generated to a feedback terminal (FB terminal) of the control circuit 100r. The feedback circuit 210 includes a shunt regulator 212 and a photocoupler 214. The shunt regulator 212 is configured as an error amplifier, and is configured to generate a feedback signal S11 having a level adjusted such that the difference between the output voltage VOUT and a predetermined target value approaches zero, and to supply the feedback signal S11 thus generated to a light-emitting diode of the photocoupler 214. A phototransistor (or otherwise a photodiode) of the photocoupler 214 is configured to convert a light signal S12 received from the light-emitting diode into the feedback voltage Vfb that corresponds to the feedback signal S11.

On the primary winding side, the transformer T1 includes an auxiliary winding W3, in addition to the primary winding W1. The auxiliary winding W3, a second diode D2, and a second output capacitor $C_{VCC}$ form a second DC/DC converter. At the second output capacitor $C_{VCC}$, a DC voltage $V_{cc}$ develops according to the switching of the switching transistor M1. The DC voltage $V_{CC}$ is supplied to a power supply terminal VCC (VCC terminal) of the control circuit 100r. A start resistor Rstart is arranged between the VCC terminal and the input terminal P1. In the starting operation, the capacitor $C_{VSS}$ is charged via the start resistor Rstart, thereby supplying the power supply voltage $V_{CC}$ to the control circuit 100r.

The control circuit 100r is configured as a so-called peak current mode pulse modulator. Specifically, the control circuit 100r includes an edge blanking circuit 102, a pulse modulator 110, a driving circuit 130, and a light load detection circuit 140.

Immediately after the switching transistor M1 is turned on, the detection voltage $V_{CS}$ temporarily jumps. In order to prevent undesired turning-off of the switching transistor M1 due to such a jump in the detection voltage $V_{CS}$, the edge blanking circuit 102 is configured to mask the detection voltage $V_{CS}$ during a mask period immediately after the switching transistor M1 is turned on.

A capacitor Cfb is connected to an FB terminal as an external component. Furthermore, the FE terminal is pulled up via a resistor R11. The feedback voltage Vfb is divided by means of the resistors R12 and R13.

The pulse modulator 110 is configured to generate a pulse signal $S_{PM}$ having a duty ratio which is adjusted according to the feedback voltage Vfb. The pulse modulator 110 is configured to control the timing at which the switching transistor M1 is turned off, according to the detection voltage $V_{CS}$ which is proportional to the coil current ILp that flows through the switching transistor M1. Known examples of such a pulse modulator 110 include an average current mode modulator, a peak current mode modulator, and a fixed off-time mode pulse modulator. A driver 104 is configured to perform switching of the switching transistor M1 according to the pulse signal $S_{PM}$.

The pulse modulator 110 shown in FIG. 1 is configured as a peak current mode modulator, and includes an error comparator 112, an oscillator 114, and a logic unit 116. The error comparator 112 is configured to compare a divided feedback voltage Vfb' with a detection voltage $V_{CS}'$. The error comparator 112 is configured to generate an off signal $S_{OFF}$ which is asserted when the detection voltage $V_{CS}'$ reaches the feedback voltage Vfb'.

The oscillator 114 is configured to generate an ON signal $S_{ON}$ which is asserted with a predetermined cycle. The logic unit 116 is configured as an SR flip-flop. The logic unit 116 is arranged such that the ON signal $S_{ON}$ is input to its set terminal, and an OFF signal $S_{OFF}$ is input to its reset terminal. An output signal (which will be referred to as a "pulse modulation signal") $S_{PM}$ of the logic unit 116 transits to the on level (high level) that corresponds to the on state of the switching transistor M1 every time the ON signal $S_{ON}$ is asserted. Furthermore, the pulse modulation signal $S_{PM}$ transits to the off level (low level) that corresponds to the off state of the switching transistor M1 every time the OFF signal $S_{OFF}$ is asserted.

The driving circuit 130 is configured to perform switching of the switching transistor M1 according to the pulse signal $S_{PM}$. The driving circuit 130 includes a pre-driver 132 and a driver 134.

The light load detection circuit 140 is configured to detect a light load state in which the DC/DC converter 10r outputs a reduced output current. The light load detection circuit 140 is configured to generate a light load detection signal S140 which is asserted (set to low level) when the DC/DC converter 10r enters the light load state. The light load detection circuit 140 includes a burst comparator 142 and an inverter 144.

When, in the light load state, the output current of the DC/DC converter 10r falls, the output voltage VOUT rises, and the feedback voltage Vfb drops. Thus, the burst comparator 142 is configured to compare the feedback voltage Vfb' with a predetermined threshold voltage Vth. Furthermore, the burst comparator 142 is configured such that, when Vfb' becomes smaller than Vth, it judges that the DC/DC converter 10r has entered the light load state. The inverter 144 is configured to invert the logic level of the light load detection signal S140.

The pre-driver 132 is configured to suspend the switching of the switching transistor M1 during a period in which the light load detection signal S140 is asserted.

In the heavy load state, the DC/DC converter 10r shown in FIG. 1 operates at a switching frequency that is the same as the frequency of the ON signal $S_{ON}$ generated by the oscillator 114. Typically, the frequency of the ON signal $S_{ON}$ is set to a frequency that is sufficiently higher than the audible band. For example, the frequency of the ON signal $S_{ON}$ is set to a frequency on the order of 50 to 100 kHz.

In the light load state, the switching transistor M1 performs a burst switching operation according to the light load detection signal S140. In this state, the switching rate of the switching transistor M1 is reduced. This reduces the charge/discharge current that flows to/from the gate capacitance of the switching transistor M1, thereby providing improved efficiency.

With such an arrangement, the period in which the light load detection signal S140 is asserted in the light load state, i.e., a period in which the switching operation is suspended, becomes longer as the supply of electric power to the load becomes smaller. Thus, in the light load state, the effective switching frequency of the switching transistor M1 becomes lower as the period of suspension of the switching operation becomes longer, and at length it enters the audible band, which is equal to or below 20 kHz, leading to acoustic noise. In particular, such acoustic noise ranging between 4 kH and 20 KHz is also referred to as "mosquito noise", which is very unpleasant. Thus, there is a demand for reducing such acoustic noise.

Also, the length of the switching noise suspension period, i.e., the switching frequency in the light load state, depends on the capacitance of the capacitor CM and the input voltage VH, in addition to the electric power supplied to the load. The capacitance of the capacitor CM and the input voltage VH differ according to the platforms on which the control circuit 100r is operated. Thus, it becomes necessary to provide noise countermeasures according to the platform.

SUMMARY OF THE INVENTION

The present invention has been made in order to solve such a problem. Accordingly, it is an exemplary purpose of an embodiment of the present invention to provide a DC/DC converter which is capable of reducing such unpleasant acoustic noise.

An embodiment of the present invention relates to a control circuit for a DC/DC converter. The DC/DC converter comprises a switching transistor and a detection resistor arranged on a path of the switching transistor. The control circuit comprises: an error comparator configured to compare a feedback voltage that corresponds to an output voltage of the DC/DC converter with a detection voltage across the detection resistor, and to generate an OFF signal which is asserted according to a comparison result; a first oscillator configured to generate a first cyclic signal which is asserted with each of a predetermined first period; a logic unit configured to generate a pulse modulation signal having a level that is switched according to the OFF signal and the first cyclic signal; a second oscillator configured to generate a second cyclic signal which is asserted with each of a second period that is longer than the first period; a light load detection circuit configured to generate a light load detection signal which is asserted when the feedback voltage becomes lower than a predetermined first threshold voltage; and a driving circuit configured to drive the switching transistor according to the pulse modulation signal, and to suspend the driving of the switching transistor during a period until the second cyclic signal is next asserted after the light load detection signal is asserted.

Another embodiment of the present invention also relates to a control circuit for a DC/DC converter. The DC/DC converter comprises a transformer, a switching transistor arranged on a current path of a primary winding of the transformer, and a detection resistor. The transformer comprises an auxiliary winding provided on its primary winding side. The control circuit comprises: an error comparator configured to compare a feedback voltage that corresponds to an output voltage of the DC/DC converter with a detection voltage across the detection resistor, and to generate an OFF signal which is asserted according to a comparison result; an ON signal generating unit configured to generate an ON signal which is asserted when a voltage at one end of the auxiliary winding becomes lower than a predetermined second threshold voltage; a logic unit configured to generate a pulse modulation signal having a level that is switched according to the OFF signal and the ON signal; a second oscillator configured to generate a second cyclic signal which is asserted with each of a predetermined second period; a light load detection circuit configured to generate a light load detection signal which is asserted when the feedback voltage becomes lower than a predetermined first threshold voltage; and a driving circuit configured to drive the switching transistor according to the pulse modulation signal, and to suspend the driving of the switching transistor during a period until the second cyclic signal is next asserted after the light load detection signal is asserted.

Yet another embodiment of the present invention also relates to a control circuit for a DC/DC converter. The control circuit comprises: a pulse modulator configured to generate a pulse modulation signal having a duty ratio that is adjusted based on a feedback voltage that corresponds to an output voltage of the DC/DC converter; a second oscillator configured to generate a second cyclic signal which is asserted with each predetermined second period; a light load detection circuit configured to generate a light load detection signal which is asserted when the feedback voltage becomes lower than a predetermined first threshold voltage; and a driving circuit configured to drive the switching transistor according to the pulse modulation signal, and to suspend the driving of the switching transistor during a period until the second cyclic signal is next asserted after the light load detection signal is asserted.

With such embodiments, even if the light load state continues and the light load detection signal is continuously asserted for a long period of time, the switching transistor is turned on once with each second period. Thus, the switching frequency at which the switching frequency operates in the light load state can be set according to the second period. Thus, such an arrangement suppresses the occurrence of undesired, unpleasant acoustic noise.

Also, the control circuit may be configured such that it is monolithically integrated on a single semiconductor substrate.

Examples of such a "monolithically integrated" arrangement include: an arrangement in which all the circuit components are formed on a semiconductor substrate; and an arrangement in which principal circuit components are monolithically integrated. Also, a part of circuit components such as resistors and capacitors may be arranged in the form of components external to such a semiconductor substrate in order to adjust the circuit constants. By integrating such a control circuit in the form of a single IC (Integrated Circuit), such an arrangement provides a reduced circuit area while maintaining improved uniformity of the circuit element characteristics.

Another embodiment of the present invention relates to a DC/DC converter. The DC/DC converter comprises: a transformer comprising a primary winding and a secondary winding; a switching transistor connected to the primary winding of the transformer; a first diode having its anode connected to the secondary winding; a first output capacitor having its one electrode grounded, and its other electrode connected to the cathode of the first diode; a feedback circuit configured to generate a feedback voltage that corresponds to the output voltage across the first output capacitor; and the control circuit according to any one of the aforementioned embodiments configured to receive the feedback voltage and to perform switching of the switching transistor.

Also, the feedback circuit may comprise: a shunt regulator configured to generate a feedback signal having a level that is adjusted such that the difference between a voltage obtained by dividing the output voltage and a predetermined target value approaches zero; and a photocoupler comprising a primary-side light-emitting element configured to be controlled according to the feedback signal. Also, a signal generated by a secondary-side element of the photocoupler may be supplied as the feedback voltage to the control circuit.

Also, the transformer may further comprise an auxiliary winding on its primary winding side. Also, the DC/DC converter further may comprise: a second diode having its anode connected to the auxiliary winding; and a second output capacitor having its one electrode grounded, and its other electrode connected to a cathode of the second diode. Also, a DC voltage across the second output capacitor may be supplied to a power supply terminal of the control circuit.

Yet another embodiment of the present invention relates to a power supply apparatus. The power supply apparatus comprises: a filter configured to perform filtering of a commercial AC voltage; a diode rectifier circuit configured to perform full-wave rectification of an output voltage of the filter; a smoothing capacitor configured to smooth an output voltage of the diode rectifier circuit, so as to generate a DC input voltage; and the DC/DC converter according to any one of the aforementioned embodiments, configured to step down the DC input voltage, and to supply the DC input voltage thus stepped down to a load.

Yet another embodiment of the present invention relates to an electronic device. The electronic device comprises: a load; a filter configured to perform filtering of a commercial AC voltage; a diode rectifier circuit configured to perform full-wave rectification of an output voltage of the filter; a smoothing capacitor configured to smooth an output voltage of the diode rectifier circuit, so as to generate a DC input voltage; and the DC/DC converter according to any one of the aforementioned embodiments, configured to step down the DC input voltage, and to supply the DC input voltage thus stepped down to the load.

Yet another embodiment of the present invention relates to a power supply adapter. The power supply adapter comprises: a filter configured to perform filtering of a commercial AC voltage; a diode rectifier circuit configured to perform full-wave rectification of an output voltage of the filter; a smoothing capacitor configured to smooth an output voltage of the diode rectifier circuit, so as to generate a DC input voltage; and the DC/DC converter according to any one of the aforementioned embodiments, configured to step down the DC input voltage so as to generate the DC output voltage.

It is to be noted that any arbitrary combination or rearrangement of the above-described structural components and so forth is effective as and encompassed by the present embodiments.

Moreover, this summary of the invention does not necessarily describe all necessary features so that the invention may also be a sub-combination of these described features.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

The invention will now be described based on preferred embodiments which do not intend to limit the scope of the present invention but exemplify the invention. All of the features and the combinations thereof described in the embodiment are not necessarily essential to the invention.

In the present specification, the state represented by the phrase "the member A is connected to the member B" includes a state in which the member A is indirectly connected to the member B via another member that does not affect the electric connection therebetween, in addition to a state in which the member A is physically and directly connected to the member B.

Similarly, the state represented by the phrase "the member C is provided between the member A and the member B" includes a state in which the member A is indirectly connected to the member C, or the member B is indirectly connected to the member C via another member that does not affect the electric connection therebetween, in addition to a state in which the member A is directly connected to the member C, or the member B is directly connected to the member C.

Figure 2:
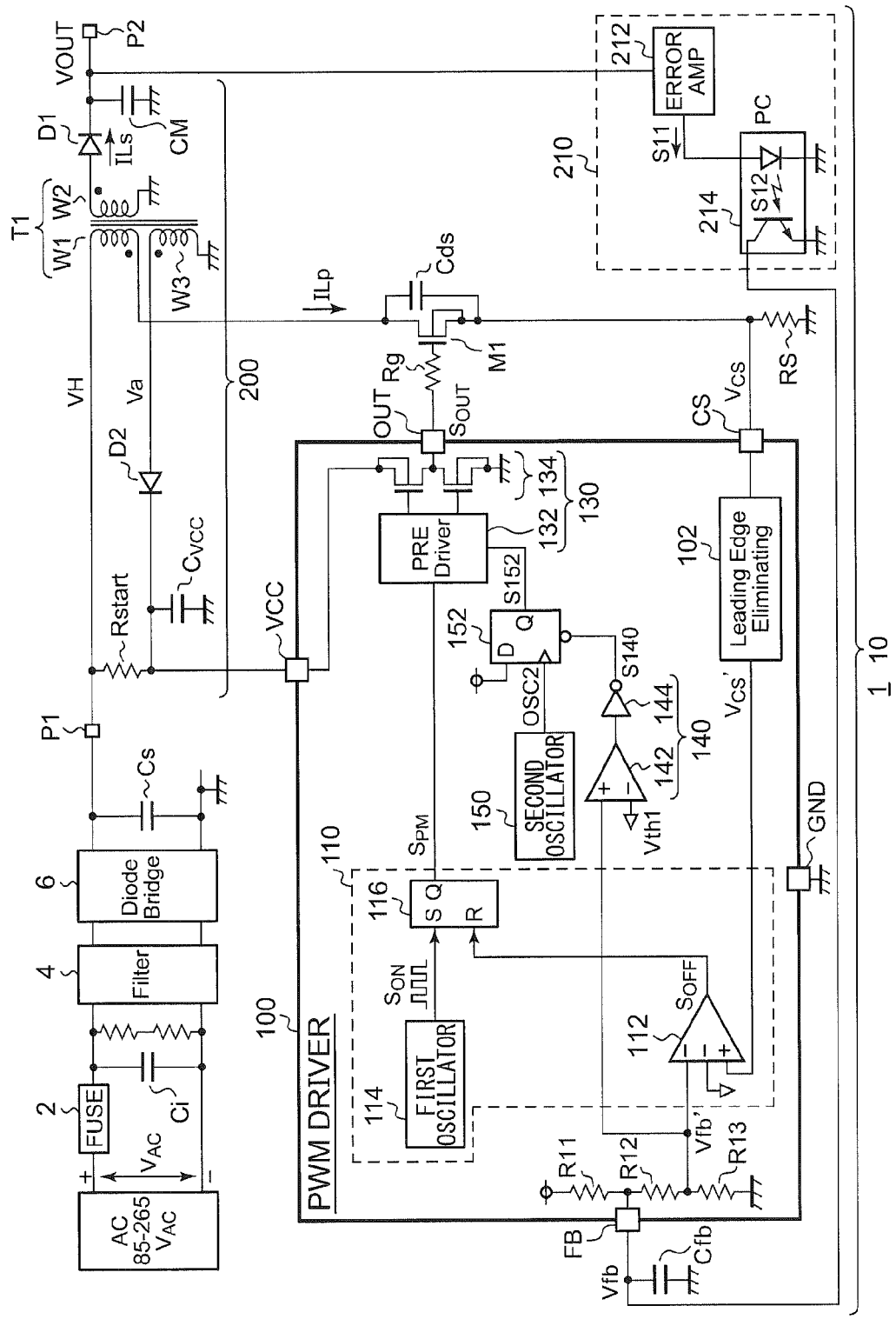
FIG. 2 is a circuit diagram showing a configuration of a DC/DC converter including a control circuit according to an embodiment.

FIG. 2 is a circuit diagram showing a configuration of a DC/DC converter 10 including a control circuit according to an embodiment.

The DC/DC converter 10 includes a control circuit 100, an output circuit 200, and a feedback circuit 210. The output circuit 200 and the feedback circuit 210 have the same configurations as those shown in FIG. 1.

Description will be made below regarding a configuration of the control circuit 100.

The control circuit 100 is configured as a function IC monolithically integrated on a single semiconductor substrate. It should be noted that description of the same components as those shown in FIG. 1 will be omitted.

The pulse modulator 110 is configured as a peak current mode modulator, and includes an error comparator 112, an oscillator 114, and a logic unit 116. The error comparator 112 is configured to compare a feedback voltage Vfb' with a detection voltage $V_{CS}'$, and to generate an OFF signal $S_{OFF}$ which is asserted (set to high level) When Vfb' becomes smaller than $V_{CS}'$.

The oscillator 114 is configured to generate a first cyclic signal (ON signal) $S_{ON}$ which is asserted with each of a predetermined first period. The logic unit 116 is configured to generate a pulse modulation signal $S_{PM}$ having a level that is switched according to the OFF signal $S_{OFF}$ and the first cyclic signal $S_{ON}$. The logic unit 116 may be configured as an SR flip-flop. Also the logic unit 116 may be configured using other kinds of logic elements.

Figure 1:
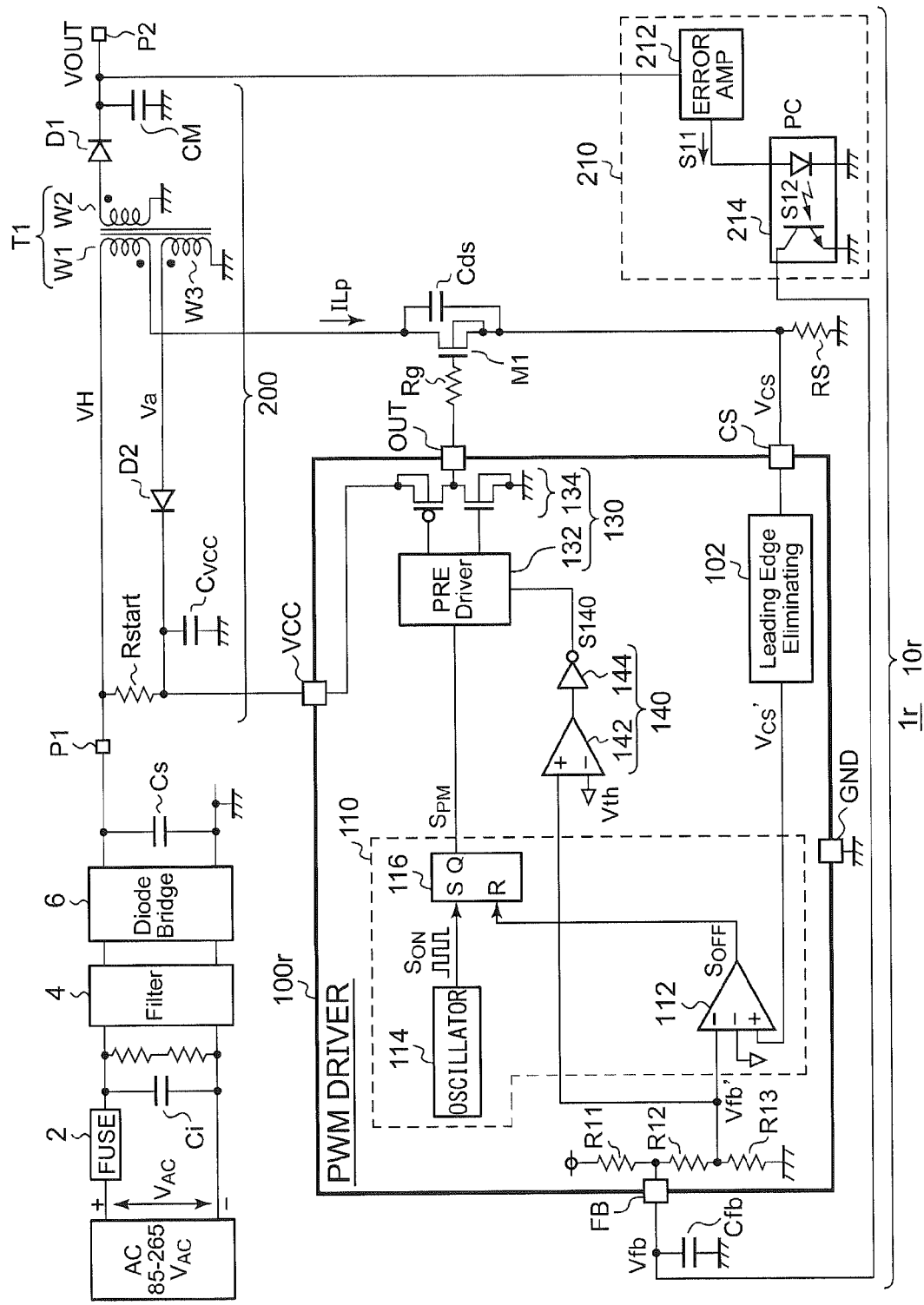
FIG. 1 is a circuit diagram showing an inverter investigated by the present inventor.

In the same way as with the light load detection circuit 140 shown in FIG. 1, a light load detection circuit 140 according to the present embodiment is configured to compare the feedback voltage Vfb' with a predetermined first threshold voltage Vth1 so as to detect a light load state. The light load detection circuit 140 is configured to assert (set to low level) a light load detection signal S140 when a light load state is detected.

The control circuit 100 shown in FIG. 2 further includes a second oscillator 150 and a logic gate 152, in addition to the configuration of the control circuit 100r shown in FIG. 1.

The second oscillator 150 is configured to generate a second cyclic signal OSC2 which is asserted (set to high level) with each of a predetermined second period that is longer than the first period. For example, the first cyclic signal $S_{ON}$ is configured to have a frequency Fsw1 of 25 KHz, and accordingly, the first period is 40 μs. On the other hand, the second cyclic signal OSC2 is configured to have a frequency Fsw1 of 4 KHz, and accordingly, the second period is 250 μs.

A driving circuit 130 is configured to drive a switching transistor M1 according to the pulse modulation signal $S_{PM}$. The driving circuit 130 is configured to suspend the driving of the switching transistor M1 during a period until the second cyclic signal OSC2 is next asserted after the light load detection signal S140 is asserted.

The logic gate 152 is configured to receive the second cyclic signal OSC2 and the light load detection signal S140. Furthermore, the logic gate 152 is configured to generate a burst control signal S152 which transits to a first level (high level) when the second cyclic signal OSC2 is asserted, and which transits to a second level (low level) when the light load detection signal S140 is asserted. The driving circuit 130 is configured to drive the switching transistor M1 during a period in which the burst control signal S152 is set to the first level (high level), and to suspend the driving of the switching transistor M1 during a period in which the burst control signal S152 is set to the second level (low level).

The logic gate 152 is configured as a D flip-flop, for example. The D flip-flop is arranged such that a high level voltage (e.g., power supply voltage Vcc) is input to its input terminal (D), the second cyclic signal OSC2 is input to its clock terminal, and the light load detection signal S140 is input to its reset terminal (inverted logical signal). The driving circuit 130 is configured to suspend the driving of the switching transistor M1 during a period in which the output signal S152 of the logic gate 152 is set to low level, and to perform switching of the switching transistor M1 according to the pulse modulation signal $S_{PM}$ during a period in which the output signal S152 of the logic gate 152 is set to high level.

Also, the logic gate 152 may be configured as another kind of logic gate, e.g., it may be configured as an RS flip-flop instead of such a D flip-flop, which is readily understood by those skilled in this art.

Figure 3:
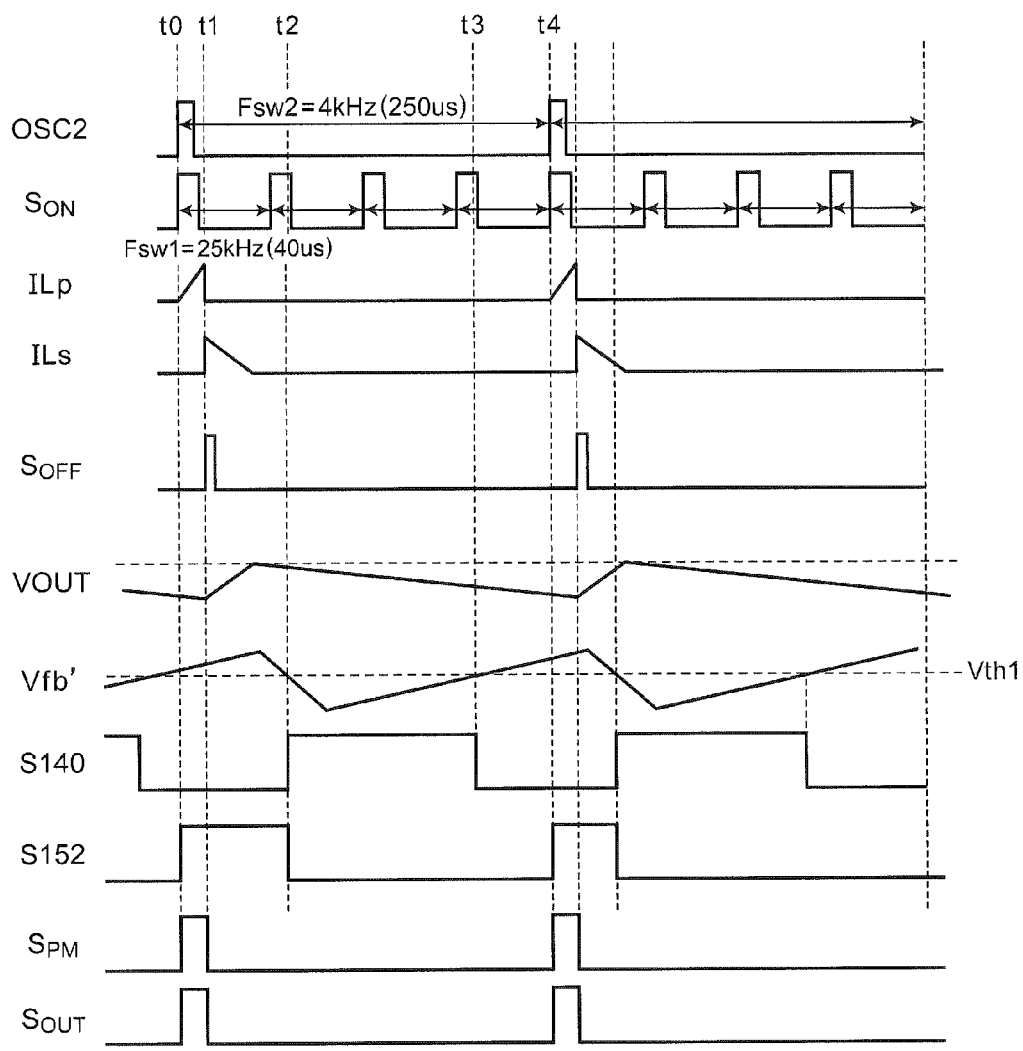
FIG. 3 is a waveform diagram showing the operation of the DC/DC converter shown in FIG. 2 in the light load state.

The above is the configuration of the control circuit 100. Next, description will be made regarding the operation thereof. FIG. 3 is a waveform diagram showing the operation of the DC/DC converter 10 shown in FIG. 2 in the light load state.

When the ON signal $S_{ON}$ is asserted at the time point to, the pulse modulation signal $S_{PM}$ transits to the on level (high level), which sets the output signal $S_{OUT}$ to high level, thereby turning on the switching transistor M1. When the switching transistor M1 is turned on, the current ILp that flows through the primary winding W1 increases over time. Furthermore, the detection voltage $V_{CS}$ rises such that it is proportional to the current ILp. When the detection voltage $V_{CS}'$ reaches the feedback voltage Vfb' at the time point t1, the pulse modulation signal $S_{PM}$ transits to the off level, which turns off the switching transistor M1.

When the switching transistor M1 is turned off, the first output capacitor CM is charged by the current ILs that flows through the secondary winding W2, which raises the output voltage VOUT. The feedback signal Vfb' falls according to the rise of the output voltage VOUT. Subsequently, the light load detection signal S140 is asserted at the time point t2. When the light load detection signal S140 is asserted, the burst control signal S152, which is the output of the logic gate 152, is switched to low level. When the burst control signal S152 is switched to low level, the switching of the switching transistor M1 is suspended.

After the switching of the switching transistor M1 is suspended, the output voltage VOUT starts to fall, which raises the feedback voltage Vfb'. When the feedback voltage Vfb' becomes higher than the threshold voltage Vth1 at the time point t3, the light load detection signal S140 is negated (set to low level).

Subsequently, when the first cyclic signal $S_{ON}$ is asserted at the time point t4, the pulse modulation signal $S_{PM}$ is switched to the on level, which turns the switching transistor M1 on again. Furthermore, when the second cyclic signal OSC2 is asserted at the time point 4, the burst control signal S152 is asserted, which instructs the driving circuit 130 to restore the switching of the switching transistor M1.

The control circuit 100 is configured to repeatedly perform the aforementioned operation.

The advantages of the control circuit 100 will be clearly understood in comparison with the control circuit 100r shown in FIG. 1.

Figure 4A:
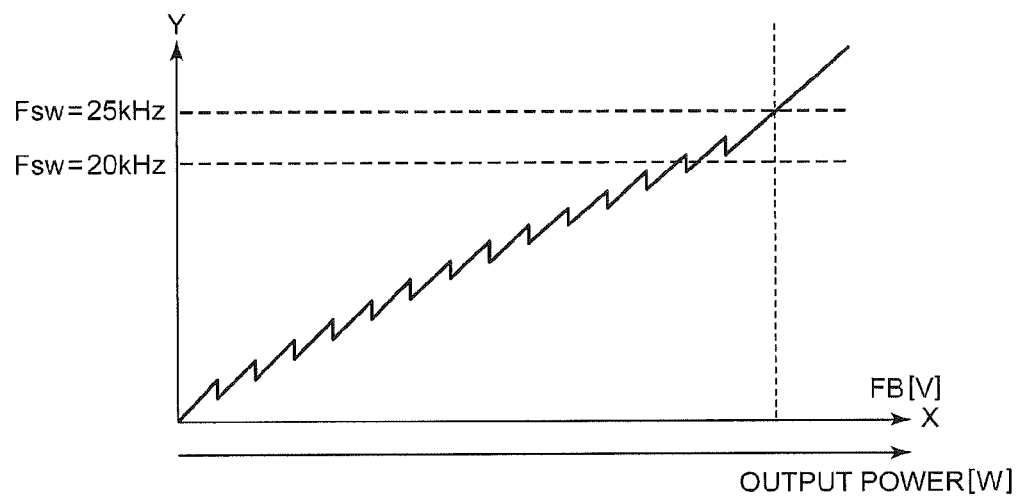
FIGS. 4A and 4B are diagrams respectively showing the relation between the output voltage, the feedback voltage, and the switching frequency in the DC/DC converters shown in FIGS. 1 and 2.
Figure 4B:
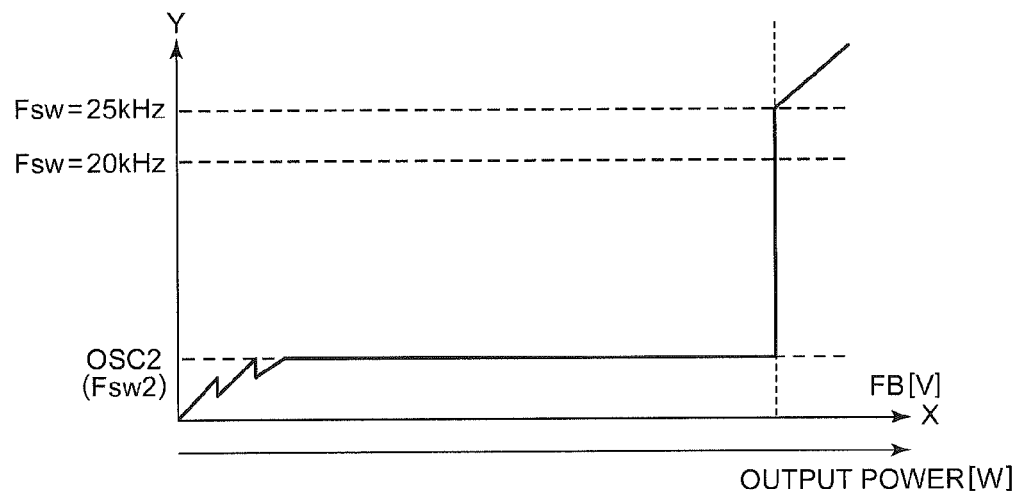

FIGS. 4A and 4B are diagrams showing the relation between the output voltage, the feedback voltage, and the switching frequency, in a case of employing the DC/DC converters shown in FIGS. 1 and 2, respectively.

With the control circuit 100 shown in FIG. 1, both the pulse width and the frequency of the light load detection signal S140 change according to a change in the output voltage. Thus, with the control circuit 100r shown in FIG. 1, as shown in FIG. 4A, the switching frequency changes in a range that includes the audible band according to a reduction in the output power in the light load state when the output power is small.

In contrast, with the control circuit 100 shown in FIG. 2, the burst control signal S152 is asserted once with each second period. That is to say, the frequency (burst frequency) of the burst control signal S152 is fixed to the frequency of the second cyclic signal OSC2. That is to say, only the pulse width of the burst control signal S152 changes according to the output power. As a result, the switching frequency is maintained at the frequency Fsw2, which is the frequency of the second cyclic signal OSC2, even if the output power falls.

Thus, by setting the frequency Fsw2 of the second cyclic signal OSC2 to a frequency that is lower than the frequency band that can be recognized by the user as unpleasant audible noise which should be avoided, e.g., by setting the frequency Fsw2 of the second cyclic signal OSC2 to 4 kHz, such an arrangement is capable of reducing such unpleasant noise. Furthermore, even if such acoustic noise occurs, the frequency of such acoustic noise is a constant value that can be predicted beforehand. Thus, such an arrangement facilitates the implementation of countermeasures with respect to such acoustic noise, which is another advantage.

Description will be made regarding the usage of the DC/DC converter 10. An inverter 1 including the DC/DC converter 10 is suitably employed in an AC adapter and a power supply block of an electronic device.

Figure 5:
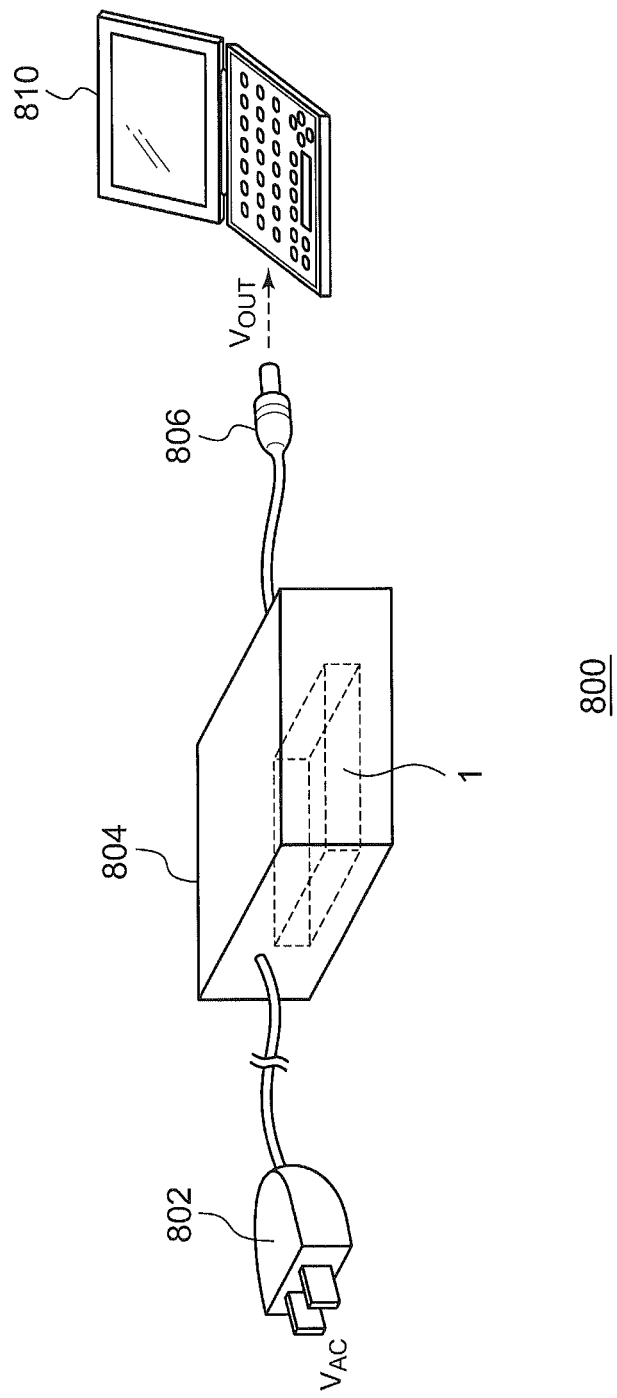
FIG. 5 is a diagram showing an AC adapter including an inverter.

FIG. 5 is a diagram showing an AC adapter 800 including the inverter 1. The AC adapter 800 includes a plug 802, a casing 804, and a connector 806. The plug 802 is configured to receive commercial AC voltage $V_{AC}$ from an unshown electrical outlet. The inverter 1 is mounted within the casing 804. The DC output voltage VOUT generated by the inverter 1 is supplied to an electronic device 810 via the connector 806. Examples of such an electronic device 810 include laptop PCs, digital still cameras, digital video cameras, cellular phone terminals, portable audio players, etc.

Figure 6A:
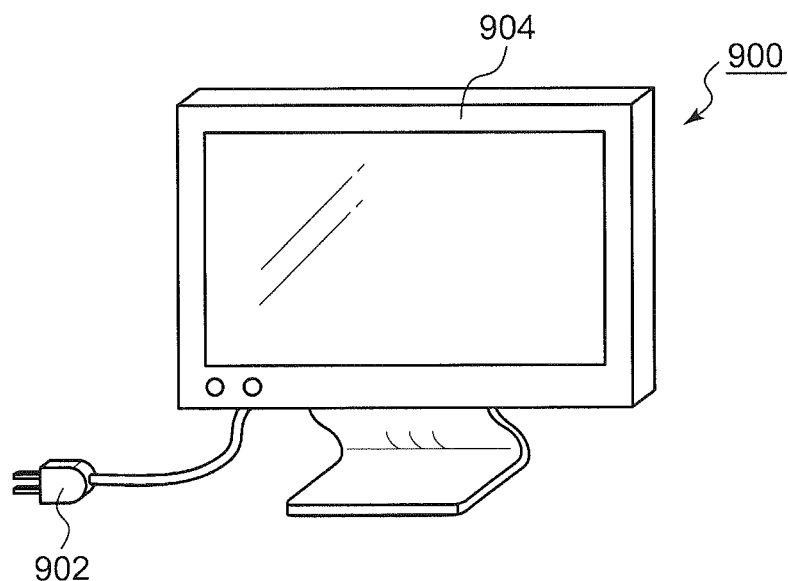
FIGS. 6A and 6B are diagrams each showing an electronic device including an inverter.
Figure 6B:
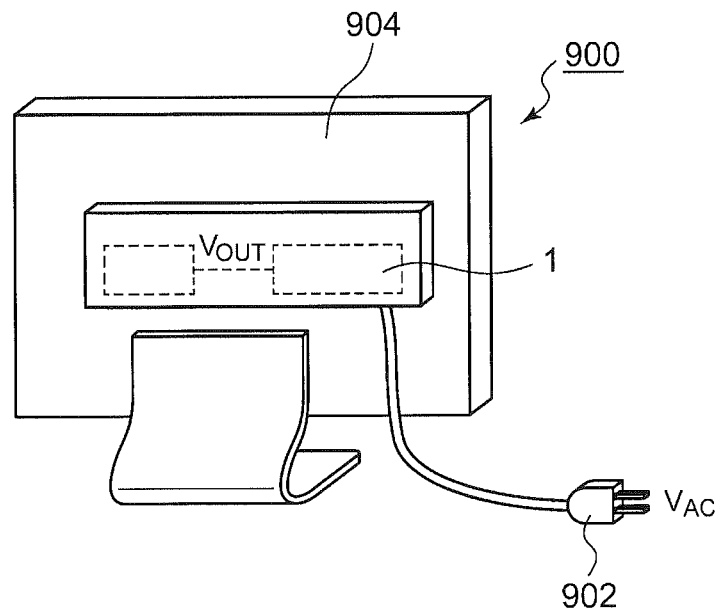

FIGS. 6A and 6B are diagrams each showing an electronic device 900 including the inverter 1. The electronic device 900 shown in FIGS. 6A and 6B is configured as a display apparatus. However, the electronic device 900 is not particularly restricted in kind, as long as it includes a power supply apparatus as an internal component. Examples of such an electronic device 900 include audio devices, refrigerators, washing machines, vacuum cleaners, etc.

A plug 902 is configured to receive commercial AC voltage $V_{AC}$ from an unshown electrical outlet. The inverter 1 is mounted within the casing 804. The DC output voltage VOUT generated by the inverter 1 is supplied to loads mounted within the same casing 904, examples of which include a microcomputer, DSP (Digital Signal Processor), power supply circuit, illumination device, analog circuit, digital circuit, etc.

Description has been made regarding the present invention with reference to the embodiment. The above-described embodiment has been described for exemplary purposes only, and is by no means intended to be interpreted restrictively. Rather, it can be readily conceived by those skilled in this art that various modifications may be made by making various combinations of the aforementioned components or processes, which are also encompassed in the technical scope of the present invention. Description will be made below regarding such modifications.

[First Modification]

Description has been made in the embodiment regarding the control circuit 100 using the pulse width modulation method. However, the present invention is not restricted to such an arrangement. Also, the present invention can be applied to a control circuit using the pulse frequency modulation method.

Figure 7:
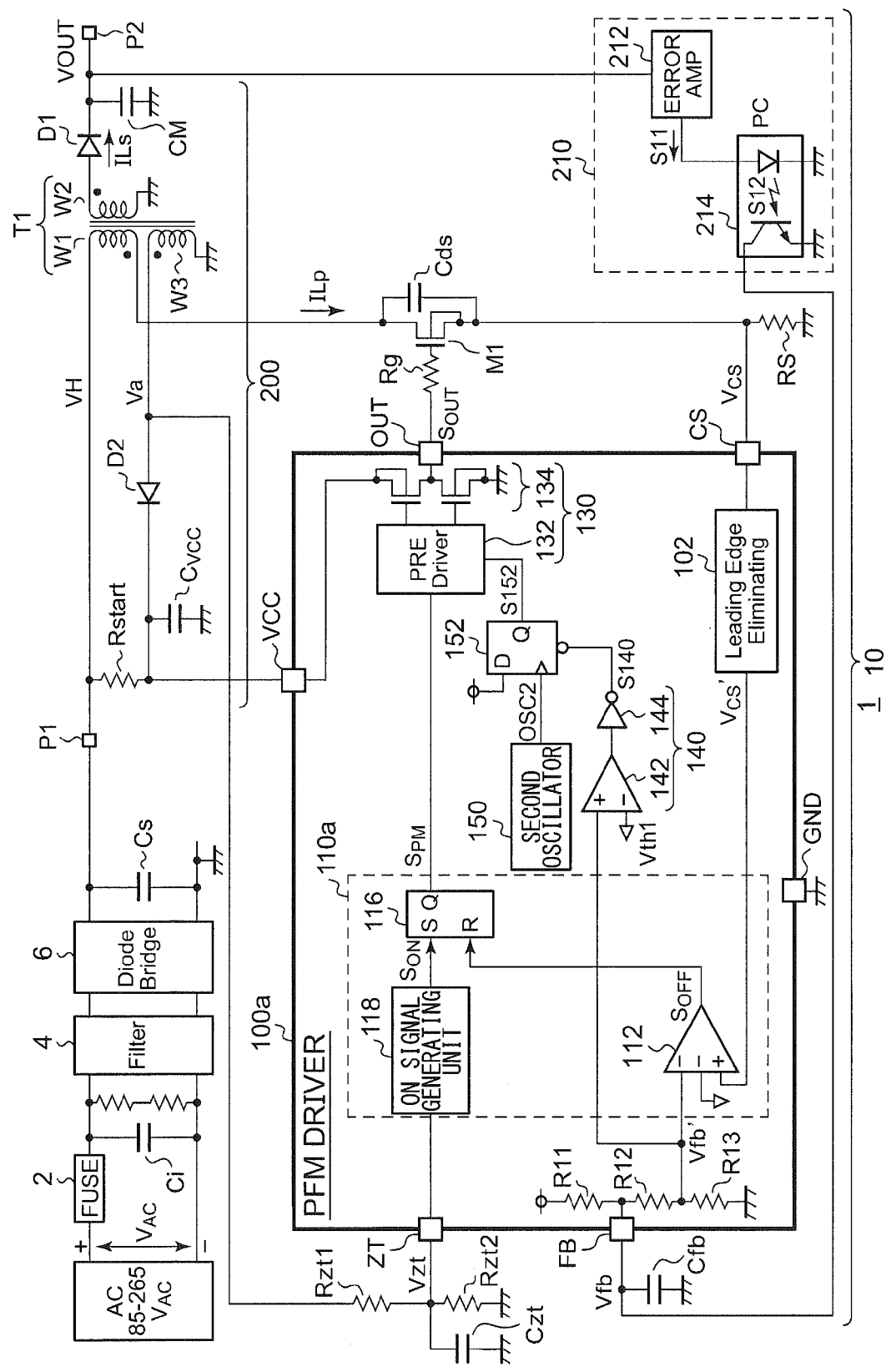
FIG. 7 is a circuit diagram showing a configuration of a control circuit according to a first modification.

FIG. 7 is a circuit diagram showing a configuration of a control circuit 100a according to a first modification. The control circuit 100a includes a ZT terminal. The voltage Va at one end of an auxiliary winding W3 is divided by resistors Rzt1 and Rzt2. The voltage Vzt thus divided is input to the ZT terminal.

A pulse modulator 110a includes an ON signal generating unit 118 instead of the oscillator 114 shown in FIG. 2. The ON signal generating unit 118 is configured to generate an ON signal $S_{ON}$ which is asserted when the voltage Va at the aforementioned one end of the auxiliary winding W3 becomes lower than a predetermined second threshold voltage Vth2.

During a period in which the switching transistor M1 is on, energy is stored in the transformer T1. On the other hand, during a period in which the switching transistor M1 is off, energy is discharged from the transformer T1. Immediately after the switching transistor M1 is turned off, the current ILs flows through the secondary winding W2 during a certain period. During this period, the voltage Va is maintained at a certain voltage level. When the energy stored in the transformer T1 approaches zero, the current ILs also approaches zero. In this stage, the voltage Va fluctuates due to quasi-resonance. When the voltage Va falls to the vicinity of zero due to such fluctuation, the ON signal generating unit 118 is configured to judge that the energy stored in the transformer T1 has become zero, and to assert the ON signal $S_{ON}$ in order to turn the switching transistor M1 on again.

The configuration and the operation of the ON signal generating unit 118 are not restricted in particular, and may be configured using known techniques. For example, when the ON signal generating unit 118 detects that the voltage Va at the aforementioned one end of the auxiliary winding W3 has become lower than the second threshold voltage Vth2 a predetermined number of times, the ON signal generating unit 118 may be configured to assert the ON signal $S_{ON}$. In this case, the ON signal generating unit 118 may be configured using a comparator configured to compare the voltage Vzt with a threshold voltage, and a counter configured to count the transitions of the output of the comparator.

With another modification, the ON signal generating unit 118 may be configured to assert the ON signal $S_{ON}$ when it detects that the voltage Va at the aforementioned one end of the auxiliary winding W3 becomes lower than the second threshold voltage Vth2 after a certain set mask period elapses after the switching transistor M1 is turned off.

The above is the configuration of the control circuit 100a. The control circuit 100a thus configured provides the same advantages as those provided by the control circuit 100 shown in FIG. 2.

[Second Modification]

Description has been made in the embodiment regarding the peak current mode pulse modulator 110. However, the present invention is not restricted to such an arrangement. FIG. 8A is a circuit diagram showing a configuration of a pulse modulator 110b according to a second modification. The pulse modulator 110b shown in FIG. 8A is configured as a so-called average current mode modulator. An error amplifier 120 is configured to generate an error voltage Verr obtained by amplifying and averaging the difference between the feedback voltage Vfb' and the detection voltage $V_{CS}'$. An oscillator 122 is configured to generate a cyclic signal OSC1 having a triangle waveform or otherwise a sawtooth waveform with a predetermined frequency Fsw1. A PWM (pulse width modulation) comparator 124 is configured to compare the error voltage Verr with the cyclic signal OSC1, and to generate a pulse modulation signal $S_{PM}$ that is pulse-width modulated according to the comparison result. With such an average current mode modulator, such an arrangement provides the same advantages as those provided by the embodiment.

[Third Modification]

Figure 8B:
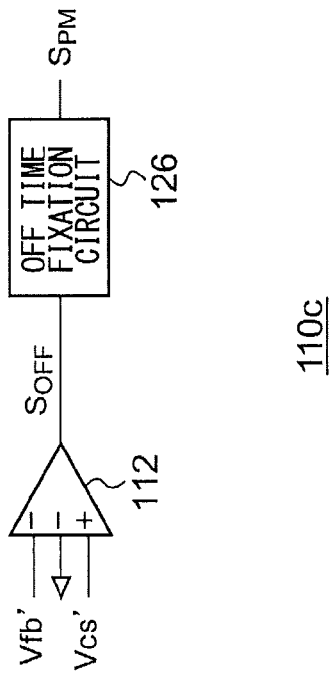
FIGS. 8A and 8B are circuit diagrams showing the configurations of the pulse modulators according to the second and third modifications, respectively.
Figure 8A:
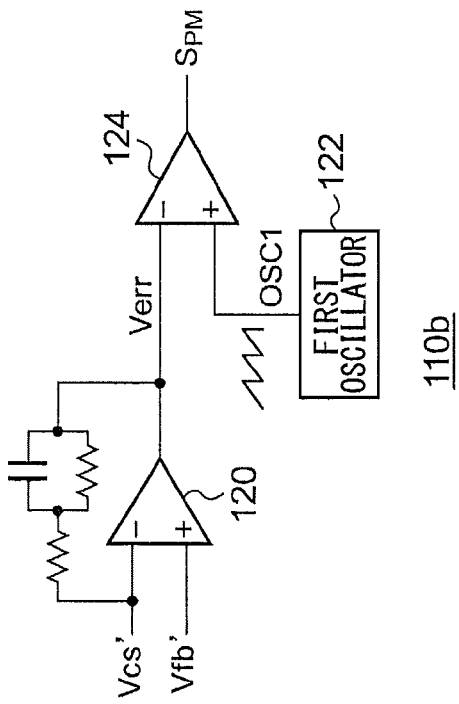

FIG. 8B is a circuit diagram showing a configuration of a pulse modulator 110c according to a third modification. The pulse modulator 110c shown in FIG. 8B is configured as a so-called fixed off-time mode pulse modulator.

The error comparator 112 is configured to compare the feedback voltage Vfb' with the detection voltage $V_{CS}'$, and to generate an OFF signal $S_{OFF}$ which is asserted according to the comparison result. An off time fixation circuit 126 is configured to generate a pulse modulation signal $S_{PM}$ which is switched to the off level (e.g., high level) which corresponds to the off state of the switching transistor M1 when the off signal $S_{OFF}$ is asserted, and which is switched to the on level (e.g., low level) which corresponds to the on state of the switching transistor M1 after a predetermined off time $T_{OFF}$ elapses after the pulse modulation signal $S_{PM}$ is switched to the off level. With such a fixed off-time pulse mode modulator, such an arrangement provides the same advantages as those provided by the embodiment.

[Fourth Modification]

Description has been made in the embodiment and in the first through third modifications regarding an insulated DC/DC converter. Also, the present invention is applicable to a non-insulated DC/DC converter. In this case, such an arrangement includes an inductor instead of the transformer T1 included in the output circuit 200.

[Fifth Modification]

Description has been made in the embodiment regarding a step-down DC/DC converter. Also, the present invention is applicable to a step-up DC/DC converter. With such an arrangement, the topology of the output circuit 200 may preferably be modified.

[Sixth Modification]

Description has been made in the embodiment regarding an arrangement in which the shunt regulator (error amplifier) 212 is provided on the secondary side of the transformer T1. Also, such an error amplifier may be provided on the primary side of the transformer T1. Also, such an error amplifier may be built into the control circuit 100.

Description has been made in the embodiment regarding an arrangement employing a positive logic (active high) system in which the assert state of each signal is associated with the high level, and the negate state of each signal is associated with the low level. Also, an arrangement may be made employing a negative logic system. Also, such an arrangement may employ a combination of the positive logic system and the negative logic system.

Description has been made regarding the present invention with reference to the embodiments using specific terms. However, the above-described embodiments show only the mechanisms and applications of the present invention for exemplary purposes only, and are by no means intended to be interpreted restrictively. Rather, various modifications and various changes in the layout can be made without departing from the spirit and scope of the present invention defined in appended claims.

What is claimed is:

1. A control circuit for a DC/DC converter comprising a switching transistor and a detection resistor arranged on a path of the switching transistor, the control circuit comprising:
    an error comparator configured to compare a feedback voltage that corresponds to an output voltage of the DC/DC converter with a detection voltage across the detection resistor, and to generate an OFF signal which is asserted according to a comparison result;
    a first oscillator configured to generate a first cyclic signal which is asserted with each of a predetermined first period;
    a logic unit configured to generate a pulse modulation signal having a level that is switched according to the OFF signal and the first cyclic signal;
    a second oscillator configured to generate a second cyclic signal which is asserted with each of a second period that is longer than the first period;
    a light load detection circuit configured to generate a light load detection signal which is asserted when the feedback voltage becomes lower than a predetermined first threshold voltage; and
    a driving circuit configured to drive the switching transistor according to the pulse modulation signal, and to suspend the driving of the switching transistor during a period until the second cyclic signal is next asserted after the light load detection signal is asserted.

2. The control circuit according to claim 1, further comprising a logic gate configured to receive the second cyclic signal and the light load detection signal, and to generate a burst control signal which is switched to a first level when the second cyclic signal is asserted, and which is switched to a second level when the light load detection signal is asserted,
    wherein the driving circuit is configured to drive the switching transistor during a period in which the burst control signal is set to the first level, and to suspend the driving of the switching transistor during a period in which the burst control signal is set to the second level.

3. The control circuit according to claim 2, wherein the logic gate comprises a D flip-flop arranged such that a high level voltage is input to its input terminal, the second cyclic signal is input to its clock terminal, and the light load detection signal is input to its reset terminal.

4. The control circuit according to claim 1, configured such that it is monolithically integrated on a single semiconductor substrate.

5. A control circuit for a DC/DC converter comprising a transformer, a switching transistor arranged on a current path of a primary winding of the transformer, and a detection resistor,
wherein the transformer comprises an auxiliary winding provided on its primary winding side,
and wherein the control circuit comprises:
an error comparator configured to compare a feedback voltage that corresponds to an output voltage of the DC/DC converter with a detection voltage across the detection resistor, and to generate an OFF signal which is asserted according to a comparison result;
an ON signal generating unit configured to generate an ON signal which is asserted when a voltage at one end of the auxiliary winding becomes lower than a predetermined second threshold voltage;
a logic unit configured to generate a pulse modulation signal having a level that is switched according to the OFF signal and the ON signal;
a second oscillator configured to generate a second cyclic signal which is asserted with each of a predetermined second period;
a light load detection circuit configured to generate a light load detection signal which is asserted when the feedback voltage becomes lower than a predetermined first threshold voltage; and
a driving circuit configured to drive the switching transistor according to the pulse modulation signal, and to suspend the driving of the switching transistor during a period until the second cyclic signal is next asserted after the light load detection signal is asserted.

6. The control circuit according to claim 5, further comprising a logic gate configured to receive the second cyclic signal and the light load detection signal, and to generate a burst control signal which is switched to a first level when the second cyclic signal is asserted, and which is switched to a second level when the light load detection signal is asserted,
and wherein the driving circuit is configured to drive the switching transistor during a period in which the burst control signal is set to the first level, and to suspend the driving of the switching transistor during a period in which the burst control signal is set to the second level.

7. The control circuit according to claim 6, further comprising a D flip-flop arranged such that a high level voltage is input to its input terminal, the second cyclic signal is input to its clock terminal, and the light load detection signal is input to its reset terminal.

8. The control circuit according to claim 5, wherein the ON signal generating unit is configured to assert the ON signal when it detects that a voltage at one end of the auxiliary winding has become lower than the second threshold voltage after a set mask period elapses after the switching transistor is turned off.

9. The control circuit according to claim 5, wherein the ON signal generating unit is configured to assert the ON signal when it detects that a voltage at one end of the auxiliary winding has become lower than the second threshold voltage a predetermined number of times.

10. A control circuit for a DC/DC converter comprising a switching transistor and a detection resistor arranged on a path of the switching transistor, the control circuit comprising:
a pulse modulator configured to generate a pulse modulation signal having a duty ratio that is adjusted based on a feedback voltage that corresponds to an output voltage of the DC/DC converter;
a second oscillator configured to generate a second cyclic signal which is asserted with each predetermined second period;
a light load detection circuit configured to generate a light load detection signal which is asserted when the feedback voltage becomes lower than a predetermined first threshold voltage; and
a driving circuit configured to drive the switching transistor according to the pulse modulation signal, and to suspend the driving of the switching transistor during a period until the second cyclic signal is next asserted after the light load detection signal is asserted.

11. The control circuit according to claim 10, wherein the pulse modulator comprises:
an error comparator configured to compare a feedback voltage that corresponds to an output voltage of the DC/DC converter with a detection voltage across the detection resistor, and to generate an OFF signal which is asserted according to a comparison result;
a first oscillator configured to generate a first cyclic signal which is asserted with each predetermined first period; and
a logic unit configured to generate a pulse modulation signal having a level that is switched according to the OFF signal and the first cyclic signal.

12. The control circuit according to claim 10, wherein the DC/DC converter is configured as an insulated DC/DC converter comprising a transformer that comprises an auxiliary winding on its primary winding side,
and wherein the pulse modulator comprises:
an error comparator configured to compare a feedback voltage that corresponds to an output voltage of the DC/DC converter with a detection voltage across the detection resistor, and to generate an OFF signal which is asserted according to a comparison result;
an ON signal generating unit configured to generate an ON signal which is asserted when a voltage at one end of the auxiliary winding becomes lower than a predetermined threshold voltage; and
a logic unit configured to generate a pulse modulation signal having a level which is switched according to the OFF signal and the ON signal.

13. The control circuit according to claim 12, wherein the ON signal generating unit is configured to assert the ON signal when it detects that a voltage at one end of the auxiliary winding has become lower than the second threshold voltage a predetermined number of times.

14. The control circuit according to claim 12, wherein the ON signal generating unit is configured to assert the ON signal when it detects that a voltage at one end of the auxiliary winding has become lower than the second threshold voltage after a set mask period elapses after the switching transistor is turned off.

15. The control circuit according to claim 10, wherein the pulse modulator comprises an average current mode pulse modulator.

16. The control circuit according to claim 10, wherein the pulse modulator comprises:
an error amplifier configured to generate an error voltage obtained by amplifying and averaging a difference between a feedback voltage that corresponds to an output voltage of the DC/DC converter and a detection voltage across the detection resistor; and a pulse width modulation comparator configured to compare the error voltage with a cyclic signal having a predetermined cycle and having a triangle waveform or otherwise a sawtooth waveform, and to generate a pulse modulation signal according to a comparison result.

17. The control circuit according to claim 10, wherein the pulse modulator comprises a fixed off-time mode pulse modulator.

18. The control circuit according to claim 10, wherein the pulse modulator comprises:
an error comparator configured to compare a feedback voltage that corresponds to an output voltage of the DC/DC converter with a detection voltage across the detection resistor, and to generate an OFF signal which is asserted according to a comparison result; and
an OFF time fixation circuit configured to generate a pulse modulation signal which is switched to an off level that corresponds to an off state of the switching transistor when the OFF signal is asserted, and which is switched to an on level that corresponds to an on state of the switching transistor after a predetermined off time elapses after the pulse modulation signal is switched to off level.

19. The control circuit according to claim 10, wherein the pulse modulator comprises a peak current mode pulse modulator.

20. A DC/DC converter comprising:
a transformer comprising a primary winding and a secondary winding;
a switching transistor connected to the primary winding of the transformer;
a detection resistor arranged on a path of the switching transistor;
a first diode having its anode connected to the secondary winding;
a first output capacitor having its one electrode thereof grounded, and its other electrode connected to a cathode of the first diode;
a feedback circuit configured to generate a feedback voltage that corresponds to an output voltage across the first output capacitor; and
a control circuit configured to receive the feedback voltage, and to perform switching of the switching transistor,
and wherein the control circuit comprises:
an error comparator configured to compare a feedback voltage that corresponds to an output voltage of the DC/DC converter with a detection voltage across the detection resistor, and to generate an OFF signal which is asserted according to a comparison result;
a first oscillator configured to generate a first cyclic signal which is asserted with each of a predetermined first period;
a logic unit configured to generate a pulse modulation signal having a level which is switched according to the OFF signal and the first cyclic signal;
a second oscillator configured to generate a second cyclic signal which is asserted with each of a second period that is longer than the first period;
a light load detection circuit configured to generate a light load detection signal which is asserted when the feedback voltage becomes lower than a predetermined first threshold voltage; and
a driving circuit configured to drive the switching transistor according to the pulse modulation signal, and to suspend the driving of the switching transistor during a period until the second cyclic signal is next asserted after the light load detection signal is asserted.

21. The DC/DC converter according to claim 20, wherein the feedback circuit comprises:
a shunt regulator configured to generate a feedback signal having a level that is adjusted such that the difference between a voltage obtained by dividing the output voltage and a predetermined target value approaches zero; and
a photocoupler comprising a primary-side light-emitting element configured to be controlled according to the feedback signal,
and wherein a signal generated by a secondary-side element of the photocoupler is supplied as the feedback voltage to the control circuit.

22. The DC/DC converter according to claim 20, wherein the transformer further comprises an auxiliary winding on its primary winding side,
and wherein the DC/DC converter further comprises:
a second diode having its anode connected to the auxiliary winding; and
a second output capacitor having its one electrode grounded, and its other electrode connected to a cathode of the second diode,
and wherein a DC voltage across the second output capacitor is supplied to a power supply terminal of the control circuit.

23. A power supply apparatus comprising:
a filter configured to perform filtering of a commercial AC voltage;
a diode rectifier circuit configured to perform full-wave rectification of an output voltage of the filter;
a smoothing capacitor configured to smooth an output voltage of the diode rectifier circuit, so as to generate a DC input voltage; and
the DC/DC converter according to claim 20, configured to step down the DC input voltage, and to supply the DC input voltage thus stepped down to a load.

24. An electronic device comprising:
a load;
a filter configured to perform filtering of a commercial AC voltage;
a diode rectifier circuit configured to perform full-wave rectification of an output voltage of the filter;
a smoothing capacitor configured to smooth an output voltage of the diode rectifier circuit, so as to generate a DC input voltage; and
the DC/DC converter according to claim 20, configured to step down the DC input voltage, and to supply the DC input voltage thus stepped down to the load.

25. A power supply adapter comprising:
a filter configured to perform filtering of a commercial AC voltage;
a diode rectifier circuit configured to perform full-wave rectification of an output voltage of the filter;
a smoothing capacitor configured to smooth an output voltage of the diode rectifier circuit, so as to generate a DC input voltage; and
the DC/DC converter according to claim 20, configured to step down the DC input voltage so as to generate the DC output voltage.

* * * * *

UNITED STATES PATENT AND TRADEMARK OFFICE
CERTIFICATE OF CORRECTION

| | |
|---|---|
| PATENT NO. | : 9,231,483 B2 |
| APPLICATION NO. | : 13/950838 |
| DATED | : January 5, 2016 |
| INVENTOR(S) | : Satoru Nate |

It is certified that error appears in the above-identified patent and that said Letters Patent is hereby corrected as shown below:

On the Title Page, Item 22 the correct filing date is July 25, 2013.

Signed and Sealed this
Twenty-fourth Day of May, 2016

Michelle K. Lee
*Director of the United States Patent and Trademark Office*